(12) United States Patent
Ban et al.

(10) Patent No.: US 10,429,223 B2
(45) Date of Patent: Oct. 1, 2019

(54) AIR FLOW RATE MEASURING DEVICE WITH INTEGRATED SENSOR MODULE

(71) Applicant: DENSO CORPORATION, Kariya, Aichi-pref. (JP)

(72) Inventors: Takao Ban, Kariya (JP); Junzo Yamaguchi, Kariya (JP); Keisuke Itakura, Kariya (JP)

(73) Assignee: DENSO CORPORATION, Kariya (JP)

( * ) Notice: Subject to any disclaimer, the term of this patent is extended or adjusted under 35 U.S.C. 154(b) by 91 days.

(21) Appl. No.: 15/231,308

(22) Filed: Aug. 8, 2016

(65) Prior Publication Data

US 2017/0059381 A1    Mar. 2, 2017

(30) Foreign Application Priority Data

Aug. 27, 2015  (JP) ................................ 2015-167708

(51) Int. Cl.
| | | |
|---|---|---|
| *G01M 15/05* | (2006.01) | |
| *G01F 1/696* | (2006.01) | |
| *F02D 41/18* | (2006.01) | |
| *G01F 1/684* | (2006.01) | |
| *G01F 5/00* | (2006.01) | |
| *F02D 41/28* | (2006.01) | |

(52) U.S. Cl.
CPC ............ *G01F 1/696* (2013.01); *F02D 41/18* (2013.01); *F02D 2041/286* (2013.01); *F02D 2200/0406* (2013.01); *F02D 2200/0414* (2013.01); *F02D 2200/0418* (2013.01); *G01F 1/6842* (2013.01); *G01F 5/00* (2013.01)

(58) Field of Classification Search
USPC .............................. 73/114.32, 114.33, 114.34
See application file for complete search history.

(56) References Cited

U.S. PATENT DOCUMENTS

2011/0072894 A1*  3/2011  Saito ..................... F02D 41/187
                                              73/114.34
2011/0138924 A1*  6/2011  Colombo ............ G01L 19/0092
                                              73/756

(Continued)

FOREIGN PATENT DOCUMENTS

| JP | 2010-151795 A | 7/2010 |
| JP | 2014-038056 A | 2/2014 |
| JP | 2015-004556 A | 1/2015 |

*Primary Examiner* — Eric S. McCall (57) ABSTRACT

The present disclosure provides an air flow rate measuring device disposed in an intake air passage. The air flow rate measuring device measures a flow rate of the intake air flowing through the intake air passage. The air flow rate measuring device includes a casing, a flow rate sensor, and a sensor module. The casing defines a bypass passage to take in a portion of the intake air. The flow rate sensor is disposed in the bypass passage. The flow rate sensor generates an output signal according to a flow rate of the intake air. The sensor module protrudes from an outer wall of the casing. The sensor module includes a multi-sensor unit that has a relative humidity sensor and a temperature sensor. The relative humidity sensor is exposed to an inside of the intake air passage to detect a relative humidity of the intake air flowing through the intake air passage. The temperature sensor detects a temperature of the intake air flowing through the intake air passage.

10 Claims, 7 Drawing Sheets

(56) References Cited

U.S. PATENT DOCUMENTS

| | | | |
|---|---|---|---|
| 2011/0174080 A1* | 7/2011 | Zorzetto | G01L 9/0051 73/756 |
| 2011/0179889 A1* | 7/2011 | De Volder | B29C 33/126 73/866.5 |
| 2012/0198925 A1* | 8/2012 | Saito | F02D 41/187 73/114.33 |
| 2013/0036806 A1 | 2/2013 | Kohno | |
| 2013/0133412 A1* | 5/2013 | Wallner | H05K 3/284 73/115.02 |
| 2013/0152675 A1* | 6/2013 | Hio | G01F 1/6845 73/114.34 |
| 2013/0174654 A1* | 7/2013 | Schneider | G01F 1/00 73/114.01 |
| 2013/0255391 A1* | 10/2013 | Schlitzkus | G01L 19/148 73/753 |
| 2014/0096609 A1* | 4/2014 | Tsai | G10K 11/004 73/584 |
| 2014/0238370 A1* | 8/2014 | Pursifull | F02D 41/005 123/690 |
| 2014/0290359 A1* | 10/2014 | Saito | G01N 25/56 73/335.02 |
| 2015/0147912 A1* | 5/2015 | Lutz | H01R 13/5045 439/577 |
| 2015/0260672 A1* | 9/2015 | Kaufmann | F02D 41/18 73/29.05 |
| 2016/0061642 A1* | 3/2016 | Arai | B29C 66/53462 73/273 |
| 2016/0104978 A1* | 4/2016 | Chaumeny | H01R 13/6683 |
| 2016/0109279 A1* | 4/2016 | O'Neill | G01F 23/38 73/313 |
| 2016/0202200 A1 | 7/2016 | Nakano et al. | |
| 2016/0297122 A1* | 10/2016 | Fischer | B29C 45/1671 |
| 2016/0329037 A1* | 11/2016 | Wehling | G10K 9/22 |
| 2017/0343442 A1* | 11/2017 | Lee | F01P 7/16 |
| 2018/0142655 A1* | 5/2018 | Thomas | F02M 51/005 |

\* cited by examiner

AIR FLOW RATE MEASURING DEVICE WITH INTEGRATED SENSOR MODULE

CROSS REFERENCE TO RELATED APPLICATION

This application is based on reference Japanese Patent Application No. 2015-167708 filed on Aug. 27, 2015, the disclosure of which is incorporated herein by reference.

TECHNICAL FIELD

The present disclosure relates to an air flow rate measuring device that measures a flow rate of an intake air used in an engine system.

BACKGROUND

Conventionally, there has been known an air flow rate measuring device that measures a flow rate of an intake air taking advantage of heat transfer with air while detecting a plurality of physical quantities of the intake air. In an engine system, advanced engine control has been required in order to achieve low fuel consumption. Thus, high accurate measuring of physical quantities of the intake air, such as an absolute humidity, a temperature, a pressure, or the like, is required in addition to measuring of a flow rate of the intake air. These physical quantities are important information involving combustion process of the engine system and are used to calculate, e.g., a fuel injection time.

For example, in a flow rate measuring device disclosed in Patent Literature 1 (JP 2011-075357 A) or Patent Literature 2 (JP 2015-004556 A), a humidity sensor is provided to calculate an absolute humidity of an intake air. The humidity sensor includes a relative humidity detector that detects a relative humidity and a temperature detector that calculates the absolute humidity based on the relative humidity. Furthermore, in addition to the temperature detector (in other words, a first temperature detector), a second temperature detector, which is dedicated to detect a temperature of the intake air, is disposed at a position where the intake air is directly brought into contact with the second temperature detector.

In the configuration described in Patent Literature 1 and Patent Literature 2, the humidity sensor includes the relative humidity detector and the first temperature detector to calculate an absolute humidity of the intake air. The first temperature detector of the humidity sensor takes in an intake air through a sub passage branching inside the air flow rate measuring device, and the first temperature detector is arranged at a position where the intake air is not directly brought into contact with the first temperature detector. Therefore, the first temperature detector is not able to detect a real temperature of the intake air, and thus the second temperature detector is additionally arranged at a position where the intake air is directly brought into contact with the second temperature detector. As a result, two temperature signals are output from the first and second temperature detectors. Hence, the second temperature detector is additionally necessary as an intake air temperature measuring device that dedicatedly a temperature of an intake air. As a result, the number of components such as terminals and harnesses is increased, which would lead to complexity to the device.

Furthermore, the relative humidity detector of the humidity sensor is arranged at a position where the intake air is not brought into contact with the relative humidity detector. Therefore, a relative humidity of the intake air cannot be detected accurately, and as a result, accuracy of calculation of the absolute humidity of the intake air would be deteriorated due to a measuring error of the relative humidity.

In view of the above, it is an objective of the present disclosure to provide an air flow rate measuring device that accurately performs calculation of an absolute humidity of an intake air and measuring of a temperature of the intake air without an additional temperature sensor dedicated to detect a temperature of the intake air.

SUMMARY

In an aspect of the present disclosure, an air flow rate measuring device is disposed in an intake air passage for intake air to be taken in an engine system. The air flow rate measuring device measures a flow rate of the intake air flowing through the intake air passage. The air flow rate measuring device includes a casing and a sensor module.

The casing defines a bypass passage to take in a portion of the intake air flowing through the bypass passage.

The flow rate sensor is disposed in the bypass passage. The flow rate sensor generates an output signal according to a flow rate of the intake air taken in the bypass passage.

The sensor module protrudes from the outer wall of the casing and includes the multi-sensor unit that detects a relative humidity and a temperature of an intake air flowing through the intake air passage. The multi-sensor unit is exposed to the inside of the intake air passage and is integrally connected to the sensor module. The multi-sensor is positioned away from the casing. Preferably, the relative humidity sensor and the temperature sensor of the multi-sensor unit are arranged to be close to each other. Furthermore, the sensor module is preferably integrally formed with the multi-sensor unit by resin-molding.

In the above-described aspect, the sensor module protruding from the outer wall of the casing includes the multi-sensor unit that has the relative humidity sensor and the temperature sensor, that is positioned away from the casing, and that is exposed to the inside of the intake air passage. Since the multi-sensor unit is exposed to the inside of the intake air passage, an intake air in the intake air passage is directly brought into contact with the multi-sensor unit. Furthermore, since the multi-sensor unit is arranged to be away from the casing, the multi-sensor unit is not in direct contact with the casing. Therefore, heat of the intake air is directly transferred to the multi-sensor unit, and an increase in a temperature of the intake air due to heat transfer from the casing to the multi-sensor unit can be prohibited. As a result, negative effects from the casing can be avoided, thereby accurately measuring a temperature of the intake air.

Furthermore, the multi-sensor unit including the relative humidity sensor and the temperature sensor can directly detect a temperature at the relative humidity sensor and a temperature at the intake air passage at the same time. Thus, calculation of an absolute humidity from a relative humidity and measuring of an intake air temperature can be accurately performed. As a result, an additional temperature sensor conventionally used for dedicatedly detecting a temperature in the intake air passage can be eliminated, while accurately performing calculation of an absolute humidity of an intake air from a relative humidity and measuring of an intake air temperature.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION

As follows, a plurality of embodiments of the present disclosure will be described in detail. It is needless to say that the embodiments are some examples of the present disclosure, and therefore the present disclosure is not limited to these embodiment. Furthermore, each of the substantially same structures among the embodiments will be assigned to the respective common referential numeral and the description of the substantially same structures will be omitted in the subsequent embodiments.

Figure 1:
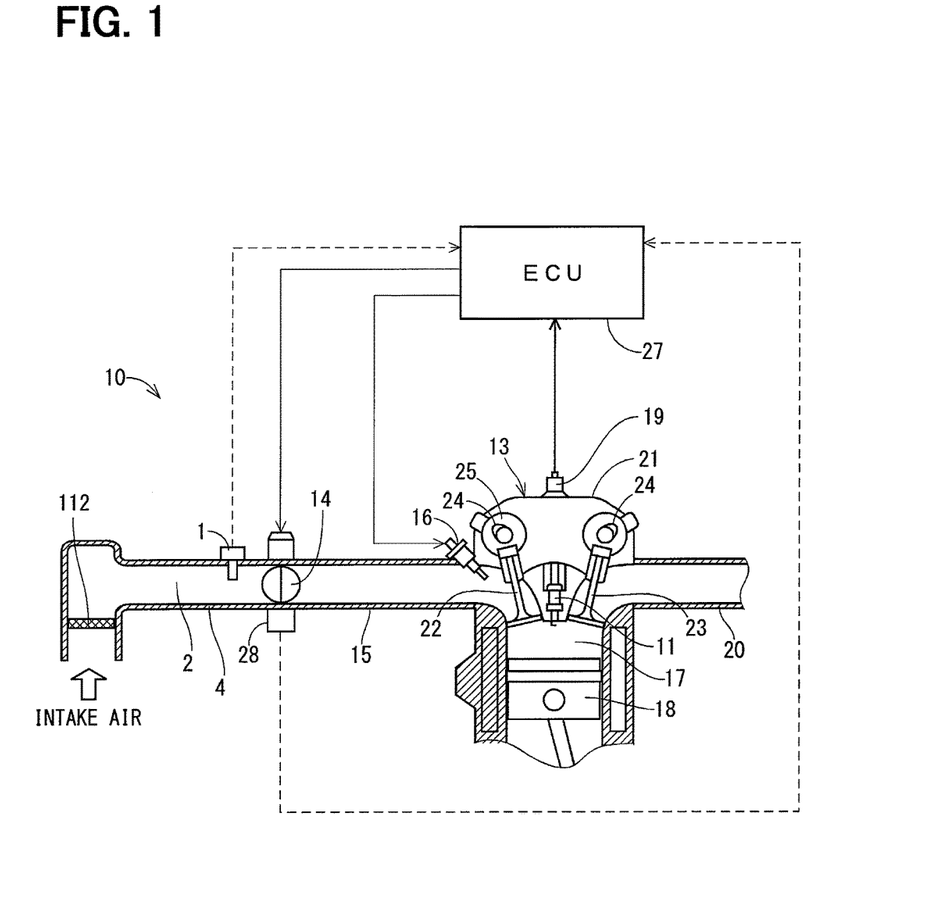
FIG. 1 is an engine system using an air flow rate measuring device according to a first embodiment.

With reference to FIG. 1, a schematic configuration of an engine system will be described first.

As shown in FIG. 1, the engine system 10 includes a spark-ignition type engine 13. The engine 13 is, for example, a multi-cylinder engine such as a four-cylinder engine, although FIG. 1 only shows a cross-section of one of cylinders. The following description can be applied to other cylinders not shown in FIG. 1.

The engine system 10 of FIG. 1 does not include an EGR (Exhaust Gas Recirculation) system. Even if the EGR system is provided, the EGR system would not be illustrated because the EGR system has low relevancy to technical features of the present disclosure. Furthermore, a catalyst disposed in an exhaust passage is also not illustrated.

In the engine 13, a mixed gas of an intake air supplied from an intake manifold 15 through an air cleaner 112 and a throttle valve 14 and a fuel injected from an injector 16 is combusted in a combustion chamber 17. A piston 18 reciprocates due to an explosion power by the combustion. Exhaust gas is released into the atmosphere through an exhaust manifold 20.

An intake valve 22 is disposed in an intake port of a cylinder head 21 that is an inlet of the combustion chamber 17, whereas an exhaust valve 23 is disposed in an exhaust port of the cylinder head 21 that is an outlet of the combustion chamber 17. The intake valve 22 and the exhaust valve 23 are operated to close or open the respective ports through valve driving mechanisms 24. The valve timing of the intake valve 22 is adjusted by a variable valve mechanism 25.

An ignition of the mixed gas in the combustion chamber 17 generates spark discharge in the combustion chamber 17 by applying high voltage to the ignition plug 11 from the ignition coil 19.

The electric control unit 27 is formed of a microcomputer including a CPU, a ROM, a RAM and an input/output port, which is represented as "ECU" in the drawings.

As shown in the broken arrow, the electric control unit 27 inputs detection signals from a throttle opening degree sensor 28 and the air flow rate measuring device 1. The electric control unit 27 uses the detection signals to calculate the fuel injection time, and then, as shown by the solid arrow, the electric control unit 27 controls operating condition of the engine 13 by operating the throttle valve 14 and the injector 16. In this way, the detection signals from the air flow rate measuring device 1 are important information for controlling the operating condition of the engine system 10 with high accuracy.

(First Embodiment)

Next, the configuration of the air flow rate measuring device according to a first embodiment will be described with reference to FIGS. 2 to 6.

The air flow rate measuring device 1 includes a casing 7, a flow rate sensor 80, and a sensor module 40.

Figure 2:
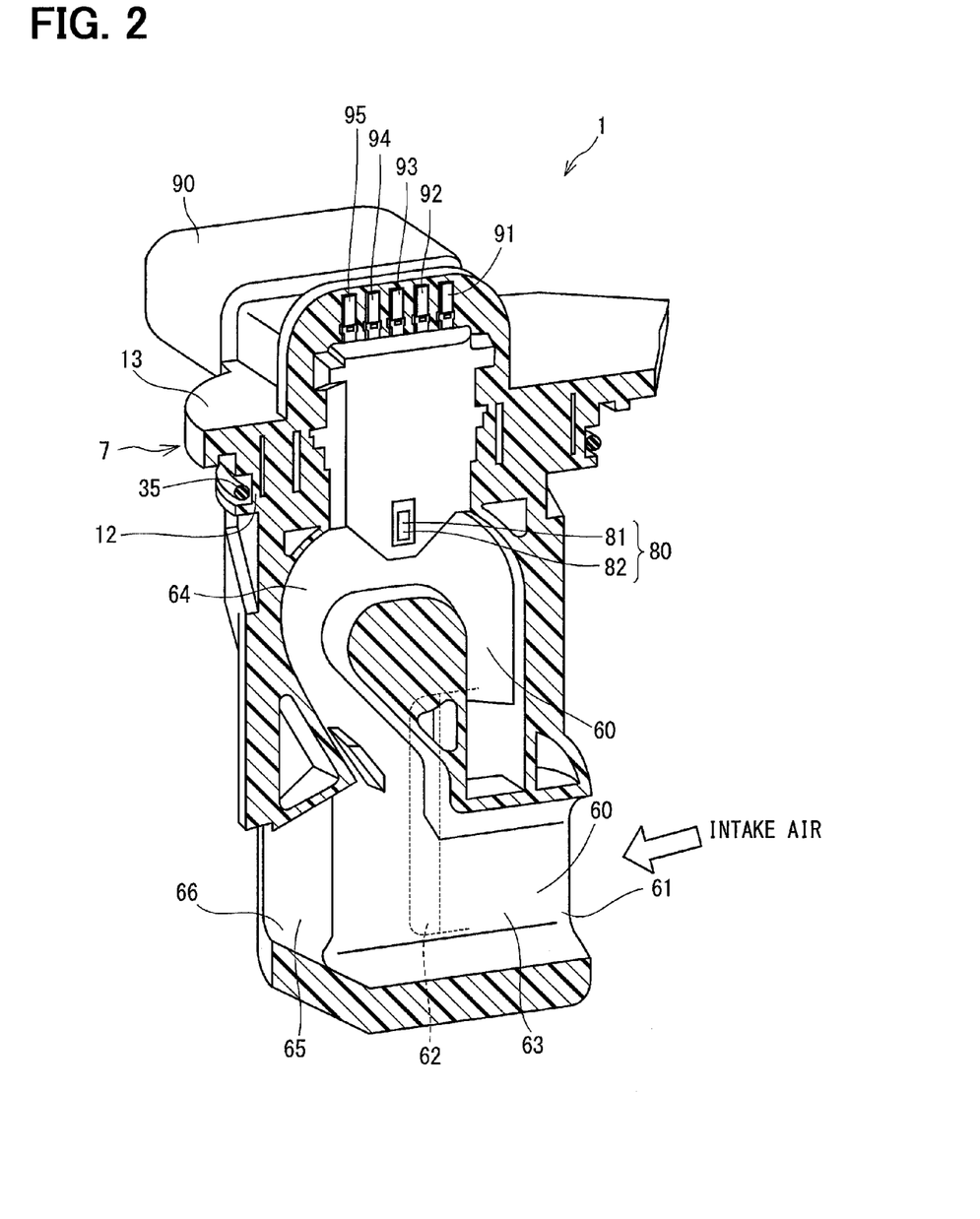
FIG. 2 is a perspective view illustrating the air flow rate measuring device according to the first embodiment.

As shown in FIG. 2, the casing 7 includes a sensor connector 90 and the flow rate sensor 80. The sensor connector 90 defines a bypass passage 60 through which an intake air flows, and the sensor connector 90 is integrally formed with the casing 7. The flow rate sensor 80 generates an output signal according to a flow rate of the intake air by heat transfer with the intake air flowing through the bypass passage 60. For example, the casing 7 is formed together with the sensor connector 90 by resin-molding. For example, an epoxy resin or a phenolic resin is used as the resin for the casing 7.

Figure 3:
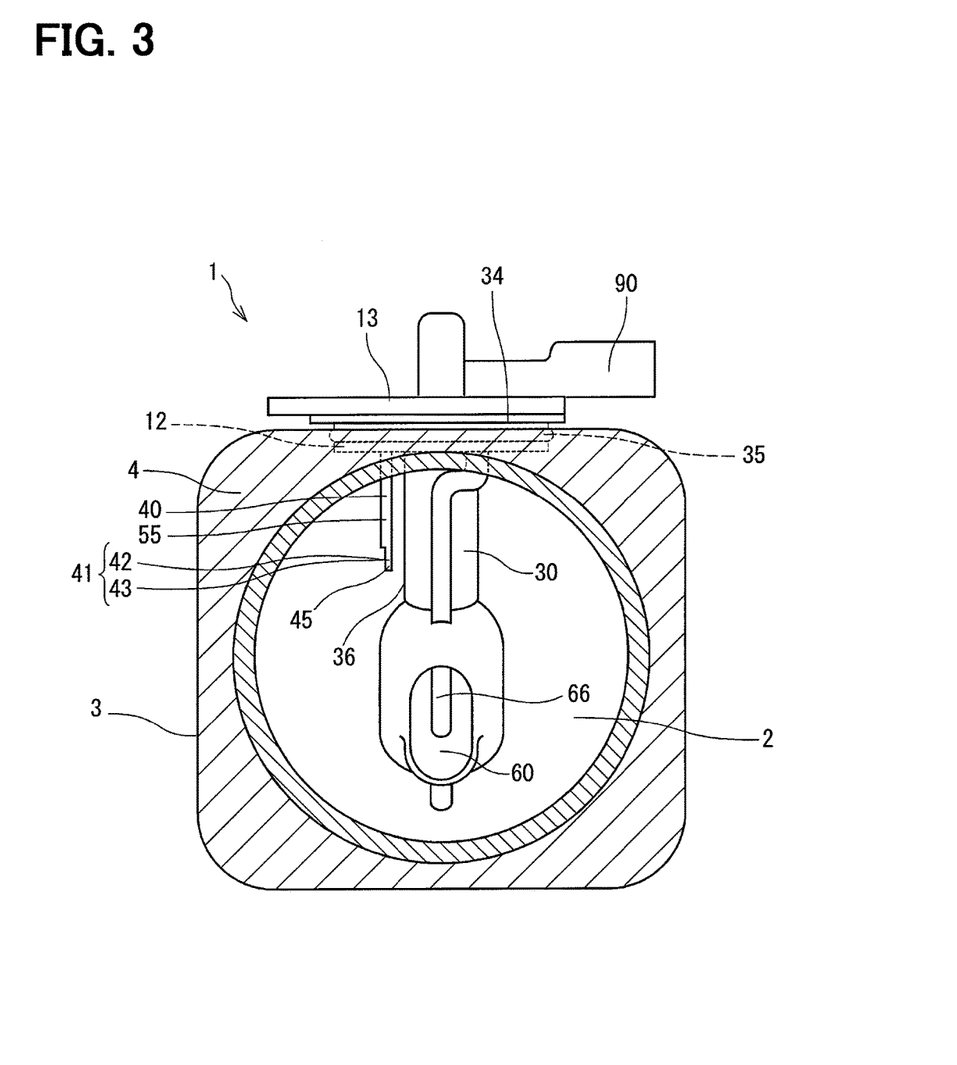
FIG. 3 is a diagram of the air flow rate measuring device disposed in an air duct.

As shown in FIG. 3, the casing 7 includes a bypass forming member 30, a fitting portion 12, and a fixing portion 13. The bypass forming member 30 defines the bypass passage 60 and protrudes into the intake air passage 2. The fitting portion 12 is a root portion of the bypass forming member 30. The fixing member 13 is fastened to the air duct 4 by a screw.

With reference to FIG. 2, the bypass passage 60 includes an inlet 61 open toward an upstream side of the intake air passage 2 in a flow direction of the intake air. The bypass passage 60 further includes outlets 62 open toward a downstream side of the intake air passage 2 in the flow direction of the intake air. Further, the bypass passage 60 includes a straight path 63 that directs the intake air as a straight flow from the inlet 61 and a detour path 64 that directs the intake air from the straight path 63 to go around.

Therefore, the path length of the bypass passage 60 is longer than the path length of a straight passage where the intake air flows through the intake air passage 2 without being taken in the bypass passage 60. The detour path 64 branches into two paths at a downstream side and the two outlets 62 are formed for the two paths. A dust discharging passage 65 to discharge dust is connected to the straight path 63 in a straight manner, and a lower end of the dust discharging passage 65 serves as a dust exhaust port 66 open toward a downstream side of the intake air passage 2.

The fitting portion 12 has two end surfaces opposite to each other in an axial direction. The bypass forming member 30 extends from one of the two end surfaces of the fitting portion 12 in a direction perpendicular to the one of the two end surfaces of the fitting portion 12. The bypass forming member 30 is inserted into the intake air passage 2 from an insert hole 34 formed in a wall 3 of the air duct 4. The bypass forming member 30 forms a core portion of the casing 7 and takes in a portion of the intake air flowing through the intake air passage 2 into the bypass passage 60.

The fitting portion 12 has a cylindrical shape, and an annular groove is formed in an outer wall of the fitting portion 12. An O-ring 35 is fit into the groove. The fitting portion 12 is fit into the insert hole 34 in the wall 3 of the air duct 4, whereby the intake air passage 2 is sealed from an outside by the O-ring 35.

The fixing portion 13 is disposed on the other of the two end surfaces of the fitting portion 12 opposite to the bypass forming member 30. The fixing portion 13 is fixed to the air duct 4 by a screw.

The sensor connector 90 includes a power terminal 91, a ground terminal 92, two sensor module terminals 93, 94, and a flow rate detecting terminal 95. The sensor connector 90 is disposed in an end surface of the fixing portion 13 opposite to the fixing portion 12. The terminals 91, 92, 93, 94, 95 are connected to an external terminal that is inside the sensor connector 90 and that is connectable to an external component.

The flow rate sensor 80 is disposed in the bypass passage 60. The flow rate sensor 80 includes a flow rate detector 81 that detects a flow rate of an intake air by heat transfer with the intake air flowing through the bypass passage 60. The flow rate sensor 80 further includes a signal processor 82 built in the flow rate detector 81. The flow rate detector 81 is formed of, e.g., a heat resistor and a thermosensitive element that are made of film resistors on a surface of a semiconductor substrate.

The flow rate detector 81 is exposed to a space at a deepest position of the detour path 64 and furthest from the straight path 63. A flow direction of an intake air at a position in the detour path 64 where the flow rate detector 81 is disposed is opposite from a flow direction of an intake air in the straight path 63 or in the intake air passage 2.

The power terminal 91 is connected to a power source, and the ground terminal 92 is connected to a ground. Thus, the flow rate detector 81 is capable of detecting a flow rate of an intake air flowing through the intake air passage 2. Output according to the flow rate of the intake air from the flow rate detector 81 is processed by the signal processor 82 to a signal according to the flow rate, then the signal is output to the electric control unit 27 outside of the flow rate measuring device 1 through the flow rate detecting terminal 95.

The sensor module 40 protruding from an outer wall of the casing 7 includes a multi-sensor unit 41 that detects a relative humidity and a temperature of an intake air flowing through the intake air passage 2. The sensor module 40 further includes a signal processing circuit 55 and a module connector 50 formed of a power terminal 51, a ground terminal 52, and output terminals 53, 54. The sensor module 40 may be formed by integrally resin-molding the multi-sensor unit 41, the module connector 50, and the signal processing circuit 55.

Figure 4:
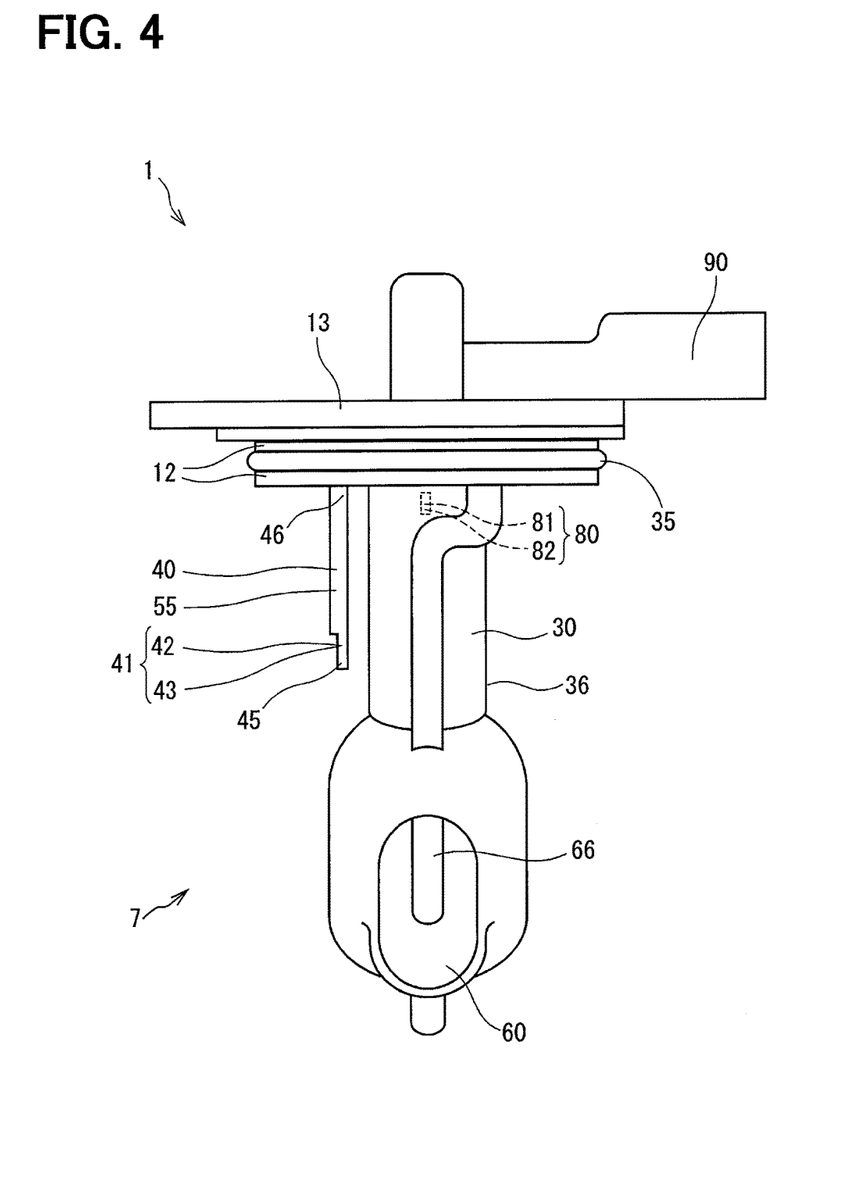
FIG. 4 is a diagram of the air flow rate measuring device according to the first embodiment.

As shown in FIG. 4, the sensor module 40 is inserted into the intake air passage 2 and protrudes from the fitting portion 12 toward the center of the intake air passage 2. The direction in which the sensor module 40 protrudes from the fitting portion 12 is the same as a direction in which the bypass forming member 30 is exposed to the inside of the intake air passage 2, in other words, a radial direction of the air duct 4. Furthermore, the protruding direction of the sensor module 40 is parallel to an outer side surface of the bypass forming member 30.

The multi-sensor detector 41 includes a relative humidity sensor 42 and a temperature sensor 43. The relative humidity sensor 42 detects a relative humidity of an intake air flowing through the intake air passage 2. The temperature sensor 43 detects a temperature of the intake air flowing through the intake air passage 2. The relative humidity sensor 42 functions using, e.g., an electric permittivity change of a polymer membrane due to a change of a relative humidity. The relative humidity sensor 42 includes a polymer membrane such as polyimide that has a permittivity variable according to the relative humidity. The temperature sensor 43 includes, e.g., a thermistor (i.e., a ceramic semiconductor) having an electric resistance variable according to a temperature.

Figure 5:
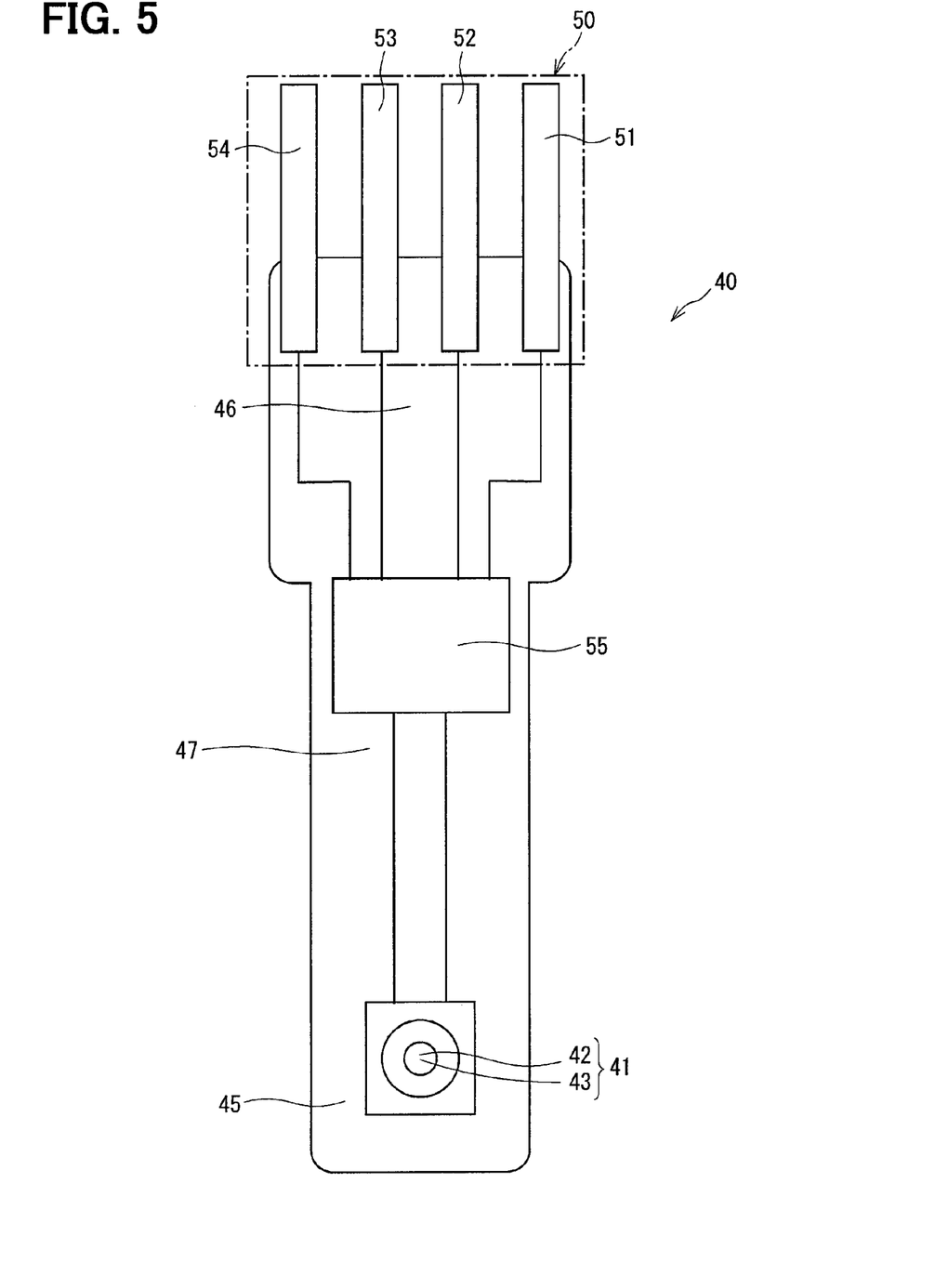
FIG. 5 is a diagram of a sensor module according to the first embodiment.

As shown in FIG. 5, the multi-sensor unit 41 is integrally formed with the sensor module 40. In the first embodiment, the multi-sensor detector 41 is connected to an outer surface of the sensor module 41 such that the multi-sensor detector 41 is exposed to the inside of the intake air passage 2. The multi-sensor unit 41 may be integrally formed with the sensor module 40 such that at least a portion of the multi-sensor unit 41 is exposed to the intake air passage 2. The relative humidity sensor 42 and the temperature sensor 43 are away from each other in the multi-sensor unit 41.

The multi-sensor unit 41 is away from the casing 7 through the sensor module 40 protruding from the outer wall of the casing 7. The multi-sensor unit 4 is arranged at a tip end 45 of the sensor module 40 so that the multi-sensor unit 41 is positioned close to the center of the air duct 4 in a radial direction.

The module connector 50 is positioned at a rear end 46 of the sensor module 40, in other words at an inserted side of the sensor module 40. The power terminal 51 is connected to the power terminal 91 of the flow rate sensor connector 90 by wire bound. Similarly, the ground terminal 52 of the module connector 50 is connected to the ground terminal 92 of the flow rate sensor connector 90 by wire bound. Accordingly, the multi-sensor unit 41 is capable of detecting a relative humidity and a temperature of an intake air flowing through the intake air passage 2.

Although the power terminal and the ground terminal are commonly used, additional terminals may be used to be connected to another power source or another ground.

The output terminal 53 of the module connector 50 is connected to the sensor module terminal 93 of the sensor connector 90 by wire bound. The output terminal 54 of the module connector 50 is connected to the sensor module terminal 94 of the sensor connector 90 by wire bound.

The signal processing circuit 55 is disposed between the multi-sensor unit 41 and the module connector 50. The relative humidity and the temperature of the intake air flowing through the intake air passage 2 detected by the multi-sensor unit 41 are processed to signals by the signal processing circuit 55. Then, the processed signals are output to the electric control unit 27 outside of the air flow rate measuring device 1 through the sensor module terminals 93, 94. In the present embodiment, the two sensor module terminals 93, 94 are used, but only one sensor module terminal may be used. The relative humidity and the temperature of the intake air detected by the multi-sensor unit 41 may be directly output to the electric control unit 27 as an intake air relative humidity output and an intake air temperature output, respectively. In this case, the electric control unit 27 may perform processing as the signal processing circuit 55. The intake air temperature output is used as information of the intake air temperature for the engine system 10 through the electric control unit 27.

For example, a processing circuit is disposed between the output terminals 53, 54 and the sensor module terminals 93, 94. The processing circuit may include an A/D converter and an interface circuit. The A/D converter is a multiplexer system or a simultaneously sampling system, and the ND converter converts the relative humidity and the temperature detected by the multi-sensor unit 41 into a digital signal. The interface circuit relates digital signals converted by the A/D converter to each other and stored the digital signals in one frame. The one frame stores a plurality of data.

The data stored in the frame is transmitted in a form of a pulse signal according to Society of Automotive Engineers Standards SAE-2716. That is, the relative humidity and the temperature detected by the multi-sensor unit 41 are transmitted in SENT protocol. SENT represents Single Edge Nibble Transmission. The processing may performed by the signal processing circuit 55. With this, a single track can be used, whereby only one sensor module terminal 93, 94 can be used.

Figure 6:
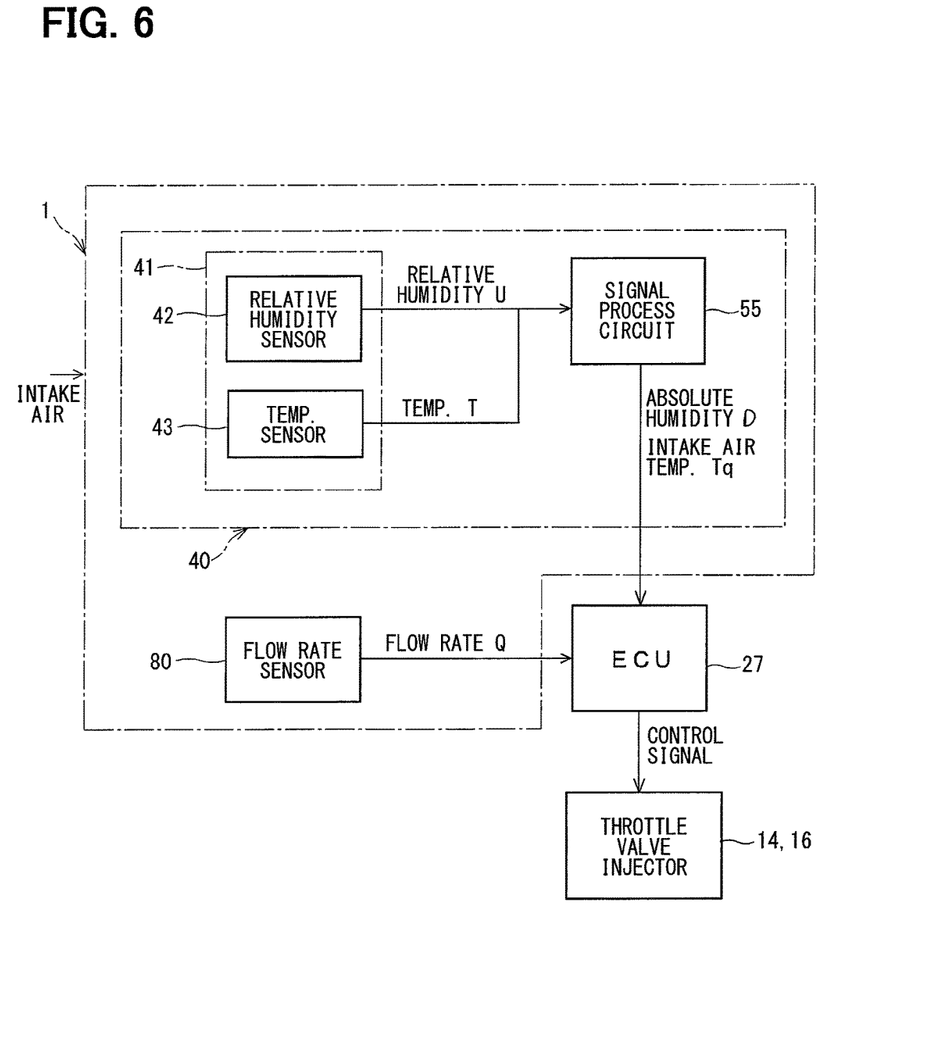
FIG. 6 is a system block according to the first embodiment.

With reference to FIG. 6, calculation of an absolute humidity of an intake air and measuring of a temperature of the intake air by the multi-sensor unit 41 will be described. The flow rate sensor 80 of the air flow rate measuring device 1 transfers the signal according to a flow rate Q of an intake air through heat transfer with the intake air to the electric control unit 27. The relative humidity sensor 42 of the multi-sensor unit 41 detects a relative humidity U of an intake air flowing in from the intake air passage 2 and outputs an output signal according to the relative humidity U. The temperature sensor 43 detects a temperature T, and outputs an output signal according to the temperature T. The temperature T indicates an intake air temperature Tq and a temperature at the relative humidity sensor 42. The signal processing circuit 55 calculates an absolute humidity D based on the relative humidity U using the temperature T.

The signal processing circuit 55 generates signals according to the absolute humidity D calculated and the intake air temperature Tq, and then transmits the signals to the electric control unit 27. The electric control unit 27 transmits the signals as control signals to the throttle valve 14 and the injector 16 to control an intake air amount and a fuel injection amount.

In the present embodiment, the sensor module 40 protruding from the casing 7 includes the multi-sensor unit 41 exposed to the inside of the intake air passage 2. The multi-sensor unit 41 includes the relative humidity sensor 42 that detects the relative humidity of an intake air in the intake air passage 2 and the temperature sensor 43 that detects a temperature of the intake air in the intake air passage 2.

As described above, the sensor module 40 protrudes from the outer wall of the casing 7, and therefore an intake air flowing through the intake air passage 2 is directly brought into contact with the multi-sensor unit 41 and the temperature sensor 43. As a result, heat is directly transferred from the intake air to the temperature sensor 43. Furthermore, the temperature sensor 43 is disposed to be away from the casing 7, whereby an increase in a temperature of an intake air due to heat transfer from the casing 7 is prohibited. Therefore, effects by heat transfer from the casing 7 can be omitted. As a result, a temperature of an intake air can be accurately measured.

The multi-sensor unit 41 includes the relative humidity sensor 42 and the temperature sensor 43. Therefore, the temperature sensor 43 can measure both an intake air temperature and a temperature at the relative humidity sensor 42 at the same time. When a temperature changes, a volume of air containing water vapor also varies. Thus, to achieve accurate calculation of an absolute humidity, temperature information is necessary in addition to a relative humidity. Thus, by using a temperature obtained from the temperature sensor 43, it is possible to increase accuracy of the intake air temperature and to more accurately calculate an absolute humidity based on the relative humidity of an intake air.

In a Japanese patent literature (JP 2013-036892 A) discloses an air flow rate measuring device including a relative humidity sensor and a temperature sensor. However, in this configuration, the position of the temperature sensor is not specified. In the first embodiment, the relative humidity sensor 42 and the temperature sensor 43 of the multi-sensor unit 41 are integrally formed with the sensor module 40. Therefore, it is possible to accurately calculate an absolute humidity of an intake air and accurately measure a temperature of the intake air. Because the calculation of the absolute humidity and the measuring of the temperature have an impact on control for an engine system, the accurate calculation of the absolute humidity and the temperature is of significance.

Above all, advanced control is required for the engine system to maintain combustion in a proper state in a combustion chamber under a condition where an environment for the air duct 4 and the intake air manifold 15 are significantly varying according to operational condition of a vehicle. Furthermore, constraints on a space for mounting the air flow rate measuring device and demand for reducing costs are high. Thus, the high accurate calculation of the absolute humidity of the intake air and the high accurate measuring of the temperature of the intake air are especially of significance for such a field.

The temperature sensor 43 integrally formed with the relative humidity sensor 42 is capable of calculating an absolute humidity from the relative humidity and of measuring the temperature of the intake air at the same time. Therefore, a conventional dedicated intake air temperature sensor can be eliminated. Therefore, the number of a connector terminal for the dedicated intake air temperature sensor and a harness for the engine ECU can be reduced.

(Second Embodiment)

Figure 7:
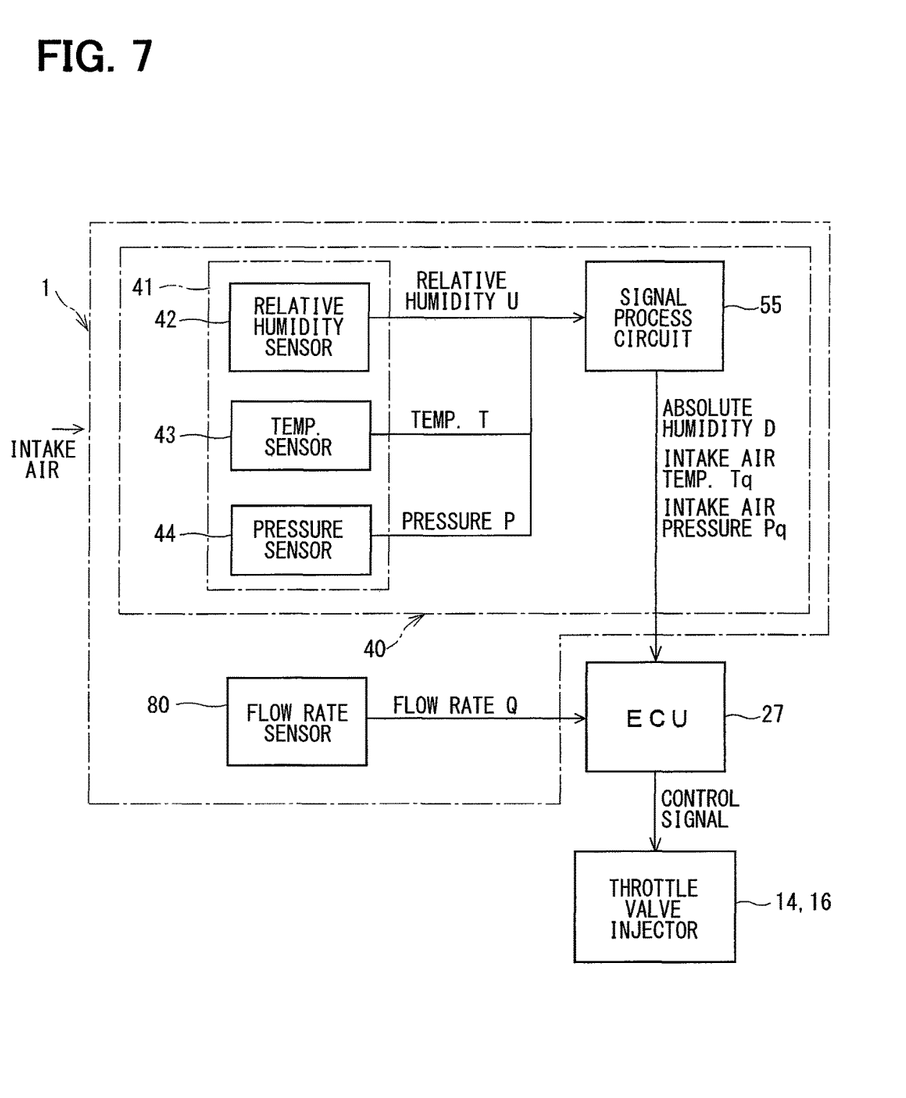
FIG. 7 is a system block according to a second embodiment.

With reference to FIG. 7, a second embodiment will be described. The multi-sensor unit 41 further includes a pressure detector 44. The pressure sensor 44 is a sensor taking advantage of a change of an electric resistance of a metal or a semiconductor according to a change of a pressure. The pressure sensor 44 includes a silicon forming a diagram deformable by a pressure. The output terminal 53, 54 of the module connector may be used as an output terminal of the pressure sensor 44, or alternatively, an addition terminal may be used and connected to another terminal.

The pressure sensor 44 detects a pressure of an intake air flowing from the intake air passage 2 and outputs an output signal according to the pressure as detected. The pressure P of the intake air, together with the relative humidity U obtained from the relative humidity sensor 42 and the temperature T obtained from the temperature sensor 43, is used for calculating the absolute temperature. The pressure P represents an intake air pressure Pq and a pressure at the relative humidity detector 42. As with the first embodiment, the signal processing circuit 55 calculates the absolute humidity D based on the relative humidity U obtained using the temperature T and the pressure P obtained. Then, the signal processing circuit 55 processes the absolute humidity D calculated, the intake air temperature Tq, and the intake air pressure Pq into signals, and then transfers these signals to the electric control unit 27. The electric control unit 27 performs a similar control as the first embodiment.

Since all air containing water vapor is affected by a partial pressure, calculation of an absolute humidity is affected by a pressure. When the air cleaner 112 is in normal operation, the pressure P of air introduced into the intake air passage 2 from the atmosphere is equal to the atmospheric pressure, there is no effect on accuracy of calculation of an absolute humidity when using a value of the atmospheric pressure. However, when the air cleaner 112 is clogged, a pressure loss generated when taking in an intake air increases, and therefore a pressure of the intake air in the intake air passage 2 is lowered as compared with the atmospheric pressure. In such a case, because the pressure has been changed, an error would generate when calculating an absolute humidity in the intake air passage 2. Thus, by directly measuring a pressure of an intake air flowing through the intake air passage 2 by the pressure detector 44, it is possible to accurately calculate the absolute humidity of an intake air flowing through the intake air passage 2. Furthermore, the pressure detected by the pressure detector 44 may be used as the intake air pressure for the engine system 10.

A Japanese patent literature (JP 2010-151795 A) discloses an air flow rate measuring device including a relative humidity sensor, a temperature sensor, and a pressure sensor. However, a sub passage branched in the air flow rate measuring device is used, and an intake air is not directly brought into contact with a sensor, and thus the air flow rate measuring device of the Japanese patent literature is not configured to accurately measure an intake air. Similar to the first embodiment, in the second embodiment, the pressure sensor 44 is exposed to the inside of the intake air passage 2 to be in direct contact with an intake air. Therefore, a pressure of an intake air in the intake air passage 2 can be accurately measured.

A pressure measured by the pressure sensor 44 can be used as information of an intake air pressure. Thus, it would be more effective when performing advanced control for an engine system. Furthermore, an additional sensor to detect a pressure of an intake air is not necessary for performing such advanced control of the engine system, and as a result, harnesses to the connector terminals and the electric control unit 27 can be eliminated.

(Other Embodiments)

The multi-sensor unit 41 may be arranged at the rear end 46 or a center portion 47 of the sensor module 40. The same effects as those of the above-described embodiments can be achieved regardless of the position of the multi-sensor unit 41.

The relative humidity sensor 42, the temperature sensor 43, and the pressure sensor 44 of the multi-sensor unit 41 may be arranged at the same position. By setting the sensors 42, 43, 44 at the same position, the temperature sensor 43 can further accurately measure the temperature at the relative humidity sensor 42 because the temperature sensor 43 is close to the relative humidity sensor 42. The similar effects can be applied to the pressure sensor 44.

The multi-sensor unit 41 and the signal processing circuit 55 can be arranged at the same position. By setting the same position, the size of the sensor module can be further reduced, leading to weight saving or low costs due to a decrease in material costs.

Three module connectors 50 can be used. The power terminal 51 and the ground terminal 52 are used while eliminating one of the output terminals 53, 54. Using the SENT protocol, outputs of physical quantities (an absolute humidity, a temperature, a pressure) detected by the multi-sensor unit 41 are processed to one signal. Accordingly, in addition to a reduction in the number of the terminals, wiring members such as harnesses can be eliminated, and therefore the configuration can be simplified.

The sensor module 40 may be integrally formed with the casing 7 together with the multi-sensor unit 41, the signal processing circuit 55, and the module connector 50 when resin-molding the casing 7. Accordingly, molding process can be simplified, and thereby leading to a reduction in costs.

What is claimed is:

1. An air flow rate measuring device disposed in an intake air passage for intake air to be taken in an engine system, the air flow rate measuring device measuring a flow rate of the intake air flowing through the intake air passage, the air flow rate measuring device comprising:
   a casing that defines a bypass passage to take in a portion of the intake air flowing through the intake air passage;
   a flow rate sensor that is disposed in the bypass passage, the flow rate sensor generating an output signal according to a flow rate of the intake air taken in the bypass passage; and
   a sensor module that is separate away from an outer wall of the casing, wherein
   the sensor module includes
      a module connector integrally formed with the sensor module,
      a multi-sensor unit integrally formed with the sensor module and having a relative humidity sensor and a temperature sensor that are integrally coupled to each other, and
      a signal processing circuit that is integrally coupled to the sensor module between the module connector and the multi-sensor unit, calculates an absolute humidity according to the temperature of the intake air, processes the absolute humidity and the temperature of the intake air flowing through the intake air passage into signals respectively, and outputs the signals,
   the relative humidity sensor is exposed to an inside of the intake air passage to detect a relative humidity of the intake air flowing through the intake air passage, and
   the temperature sensor detects a temperature of the intake air flowing through the intake air passage.

2. The air flow rate measuring device according to claim 1, wherein
   the temperature detected by the temperature sensor is output to an electric control unit as an intake air temperature output.

3. The air flow rate measuring device according to claim 1, wherein
   the multi-sensor unit further includes a pressure sensor that detects a pressure of the intake air flowing through the intake air passage.

4. The air flow rate measuring device according to claim 1, wherein
   the relative humidity sensor and the temperature sensor are away from each other in the multi-sensor unit.

5. The air flow rate measuring device according to claim 1, wherein
   the signal processing circuit processes the absolute humidity and the temperature of the intake air flowing through the intake air passage into signals respectively and outputs the signals to an electric control unit.

6. The air flow rate measuring device according to claim 1, wherein
   the module connector includes a power terminal, a ground terminal, and a single output terminal, and
   the signal processing unit processes the absolute humidity and the temperature into a single signal and outputs the single signal to an electric control unit via the single output terminal.

7. The air flow rate measuring device according to claim 1, wherein the sensor module is molded with the casing at the same time together with the multi-sensor unit, the signal processing circuit, and the module connector.

8. The air flow rate measuring device according to claim 1, further comprising:
a sensor connector that includes a sensor module terminal electrically connecting an output terminal of the module connector and an electronic control unit to each other; and
a processing circuit disposed between the sensor module terminal of the sensor connector and the output terminal of the module connector, wherein
the processing circuit converts the relative humidity and the temperature detected by the multi-sensor unit into digital signals respectively, relates the digital signals to each other, and stores the digital signals in a single frame.

9. The air flow rate measuring device according to claim 8, wherein
the digital signals stored in the single frame are transmitted to the electric control unit in a single edge nibble transmission (SENT) protocol.

10. The air flow rate measuring device according to claim 8, wherein
the single frame is configured to store a plurality of data including date about the digital signals.

* * * * *